United States Patent [19]
Polcer et al.

[11] 3,812,824
[45] May 28, 1974

[54] SODIUM-HEATED STEAM GENERATOR

[75] Inventors: John Polcer, Florham Park; Robert O. Barratt, Parsippany, both of N.J.; John Roberts, San Jose, Calif.

[73] Assignees: Foster Wheeler Corporation, Livingston, N.J.; General Electric Company, San Jose, Calif.

[22] Filed: Mar. 4, 1971

[21] Appl. No.: 121,100

[52] U.S. Cl. .................................. 122/32, 165/142
[51] Int. Cl. ............................................. F22b 1/06
[58] Field of Search ........ 165/142, 145; 122/32, 34, 122/483

[56] References Cited
UNITED STATES PATENTS

| | | | |
|---|---|---|---|
| 3,054,599 | 9/1962 | Fabregas | 165/142 X |
| 3,090,433 | 5/1963 | Amorisi et al. | 165/142 X |
| 3,254,633 | 6/1966 | Ammon et al. | 122/483 X |
| 3,483,848 | 12/1969 | Green | 122/32 |
| 3,576,179 | 4/1971 | Romanos | 122/32 |

Primary Examiner—Kenneth W. Sprague
Attorney, Agent, or Firm—John E. Wilson; Marvin A. Naigur

[57] ABSTRACT

A sodium heated steam generator in which the likelihood of tube failure from such factors as thermal growth is reduced and in which in the event of a tube failure the products of a sodium water reaction are quickly exhausted out of the steam generator. Water is generated to steam in bayonet tube assemblies extending downward into a vessel down through which liquid sodium flows and into which a central relief pipe extends to provide means for the escape of the products of an accidental sodium water reaction.

8 Claims, 4 Drawing Figures

INVENTORS
JOHN POLCER
ROBERT O. BARRATT
JOHN ROBERTS

BY John C. Wilson
ATTORNEY

INVENTORS
JOHN POLCER
ROBERT O. BARRATT
BY      JOHN ROBERTS

*John C. Wilson*
ATTORNEY

SODIUM-HEATED STEAM GENERATOR

BACKGROUND OF THE INVENTION

The most familiar type of nuclear power plant utilizes liquid sodium to cool the reactor and to transfer heat to water to make steam. Such a system presents a safety hazard because liquid sodium must be brought into indirect heat exchange with water. In the event of a material failure, the liquid sodium and water could come into contact with the result of an explosion due to the consequent sudden rise in pressure. The possibility of a sodium water reaction is ever present because of the thermal growth of the components in the steam generator and because of the erosion and corrosion which are concomitant with the use of flowing sodium.

Still another problem found in sodium heated steam generators is the problem of sodium stagnation caused by a lack of agitation in the sodium flowing through the generator. The prevention of sodium stagnation increases efficiency and reduces the chances of tube overheating and failure.

SUMMARY OF THE INVENTION

It is an object of the present invention to overcome the drawbacks found in the prior art such as those discussed above. Accordingly, a sodium heated steam generator is provided with a vertically extending elongated body in which a series of bayonet tube assemblies are positioned to extend downward into the body of liquid sodium to bring water into indirect heat exchange with the sodium to make steam. A central relief tube extends down between baffles through which the bayonet tube assemblies extend so that liquid sodium flowing downward between the relief tube and the side wall of the vessel flows axially inward and alternately outward across the bayonet tubes until it reaches the bottom of the vessel. In the event of an accidental sodium water reaction, the relief tube is adapted to exhaust the product of the reaction quickly out of the vessel to prevent a violent explosion.

DESCRIPTION OF THE PREFERRED EMBODIMENT

Figure 1:
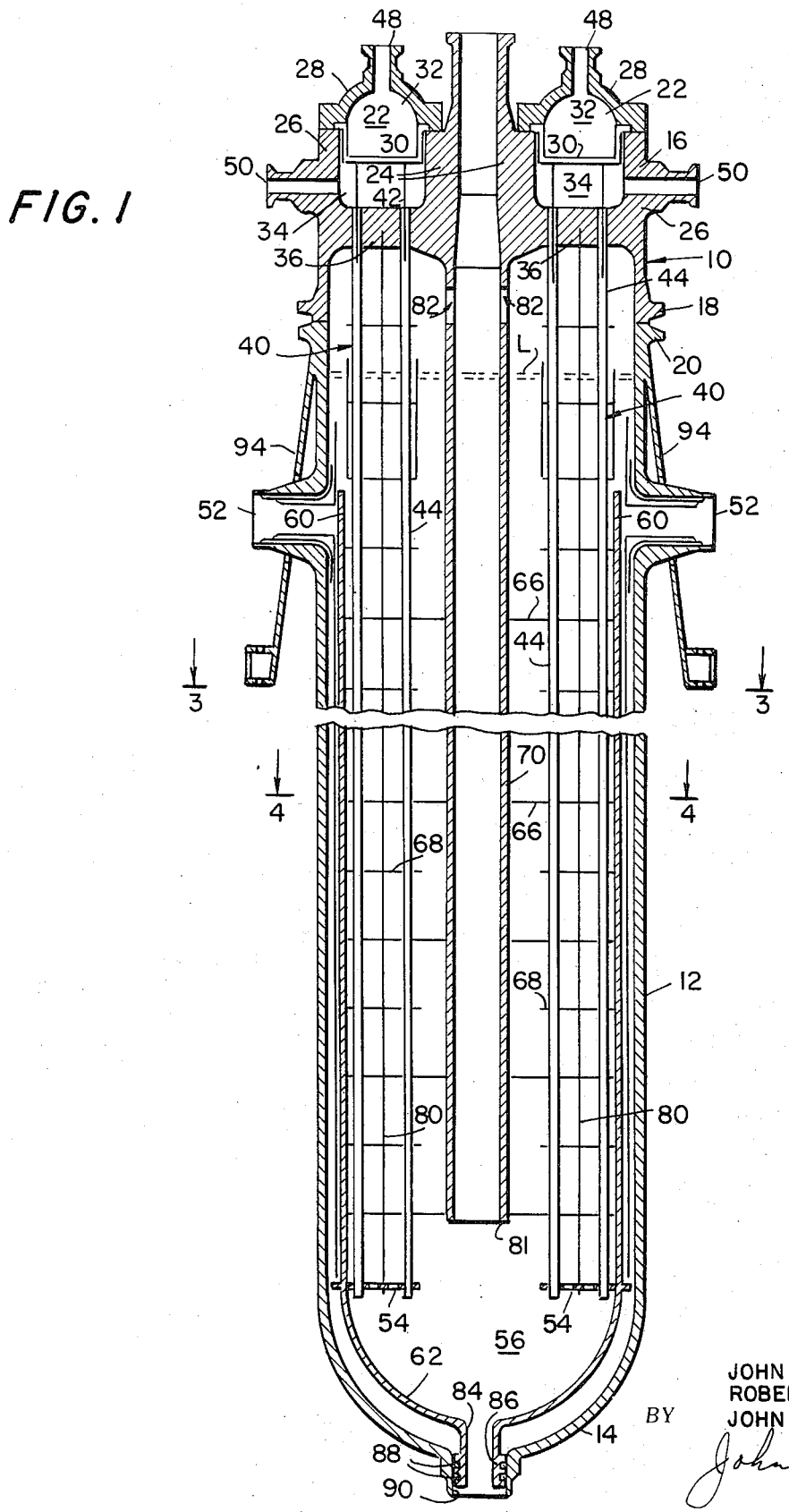
FIG. 1 shows a front view partly in section of a sodium heated steam generator made in accordance with the present invention.

There is shown in FIG. 1 a sodium heated steam generator indicated generally as 10. It consists of a pressure vessel 12 which is flared inwardly at 14 to provide a bottom and which has at its upper end a head section 16 with a lower flange 18 which is connected to a flange 20 of the pressure vessel. The head section 16 includes an annular chamber 22 which is defined by an inner vertical wall 24 and an outer vertical wall 26 and an annular head 28 which is secured to the top of the head section to completely enclose the annular chamber 22. An annular upper tube sheet 30 extends across the annular chamber 22, being secured at its marginal portions between the head 28 and the tops of the inner vertical wall 24 and the outer vertical wall 26. The upper tube sheet 30 divides the annular chamber 22 into an upper chamber 32 and a lower chamber 34. The lower chamber 34 is defined by the inner vertical wall 24, the outer vertical wall 26, the upper tube sheet 30, and a lower tube sheet 36.

Figure 2:
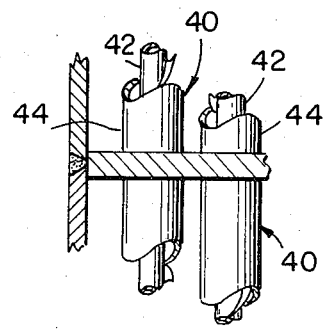
FIG. 2 is a fragmentary view showing several of the bayonet tubes of FIG. 1.

Extending downwardly from the head section 16 and into the pressure vessel 12 are a series of bayonet tube assemblies 40. The bayonet tube assemblies 40 comprise an inner tube 42 and an outer tube 44. Several of these assemblies are shown well in FIG. 2. Each of the inner tubes 42 extends upwardly to the upper tube sheet 30. Each of the outer tubes extends upwardly to the lower tube sheet 36. Although the bottoms of the bayonet tube assemblies 40 are not shown in detail in the drawings, it will be understood that the lower ends of the outer tubes 44 are closed while the lower ends of the inner tubes 42 extend almost to the ends of the outer tubes but are open. As shown in FIG. 2, spiral fins extend down between the inner tube 42 and outer tube 44 of each of the tube assemblies 40. This prevents departure from nucleate boiling, that is the accumulation of steam pockets which create areas of little heat absorption and consequent failure of the outer tubes. It has already been explained that it is necessary to prevent, as much as possible, tube failure which would result in a sodium water reaction.

A water inlet 48 allows water to enter the upper chamber 32 and flow downwardly through the inner tubes 42 and to return upwardly between the inner tubes 42 and outer tubes 44 to be transformed into steam. The steam will collect in the lower chamber 34 and then flow out through steam outlets 50 for ultimate use as in a steam turbine.

The liquid sodium which is used to generate the steam is directed into the pressure vessel 12 through a sodium inlet 52 and allowed to flow downwardly through the pressure vessel 12 through a perforated flow distribution sheet 54 to a lower chamber 56 and out of the pressure vessel 12 through a sodium outlet 58. It is maintained at a level L within the generator 10.

In order to insulate the pressure vessel 12 from the extremely high temperatures of the incoming sodium a flow shroud 60 is provided. The flow shroud 60 is generally cylindrical in configuration but has an inwardly flared bottom 62 which directs the downflowing sodium to the sodium outlet 58. As shown in FIG. 1, the flow shroud 60 is spaced inwardly from the pressure vessel 12 and extends to a location slightly above the sodium inlet 52. Sodium entering through the sodium inlet 52 will flow primarily upwardly over the flow shroud but some of it will flow down between the flow shroud 60 and the pressure vessel 12 to completely fill the space between those two members. During operation this space will be completely filled with sodium which will insulate the pressure vessel 12 from the high temperatures of the sodium being received by the steam generator 10.

The interior surface of the sodium inlet and most of the interior surface of the pressure vessel 12 are covered with a stainless steel liner 64 which in the event of a leak in the flow shroud 60 will delay the sodium before it starts burning through the pressure vessel 12 for a time long enough for instrumentation to indicate the existence of the leak and emergency procedures to be executed. A suitable system would, for example, detect the presence of hydrogen which is released as the liquid sodium burns through the stainless steel liner 64. With adequate warning the water and sodium in the generator can be withdrawn to prevent damage caused by the pressure created by a larger sodium water reaction. The hot sodium flowing over the flow shroud 60 will flow downward over the bayonet tube assemblies 40 in an inward and alternately outward flow path due to a series of baffles.

Figure 3:
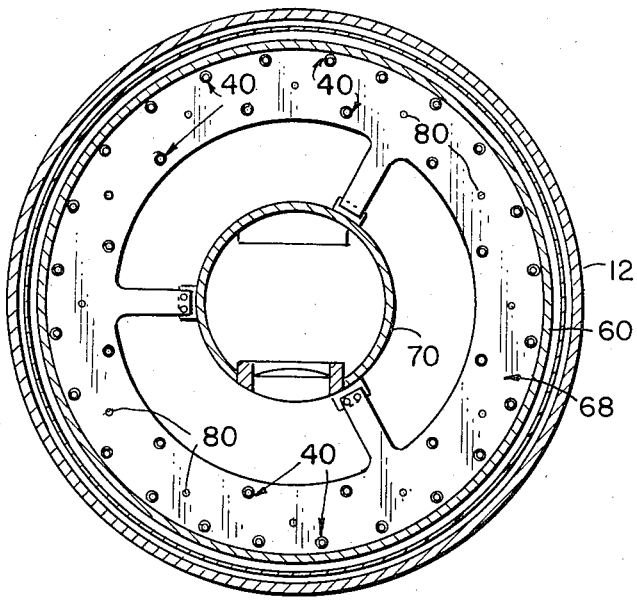
FIG. 3 is a top view partly in section taken substantially along the line 3—3 of FIG. 1.

In order to assure crossflow of the liquid sodium over the bayonet tube assemblies 40, inner baffles 66 and outer baffles 68 are provided. The inner baffles 66 are spaced along the length of the generator 10 alternately with the outer baffles 68. One of the outer baffles 68 is shown in plan in FIG. 3. It extends inwardly from the flow shroud 60 to a circle midway between the shroud and a central relief tube 70 the function of which will be described presently. In order to assure rigidity, inwardly extending webs permit the outer baffles 68 to be connected with the central relief tube 70.

Figure 4:
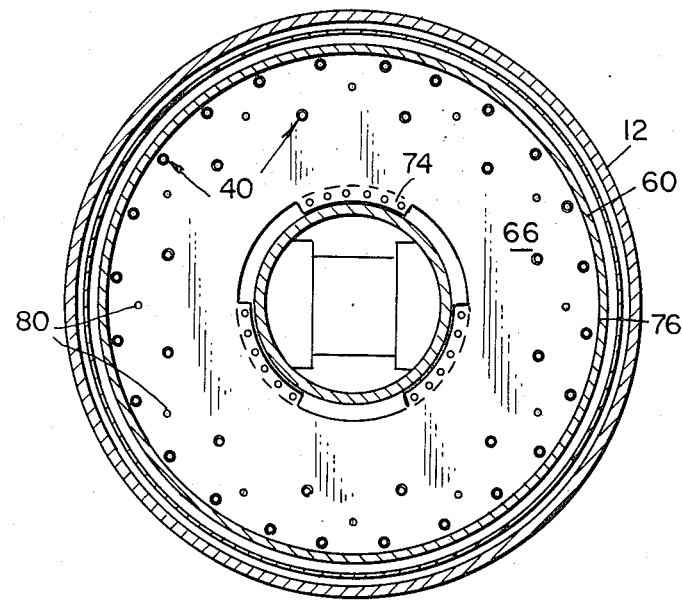
FIG. 4 is a top view partly in section taken substantially along the line 4—4 of FIG. 1.

FIG. 4 shows one of the inner baffles 66. It is connected at a web 74 to the central relief tube 70 and extends outwardly to its periphery 76. The baffles 66 and 68 are connected with each other and with the perforated flow distribution sheet 54 and the lower tube sheet 36 by means of tie rods 80. The alternate spacing of the inner baffles 66 and the outer baffles 68 assures that the sodium will flow across bayonet tube assemblies 40 throughout the length of its travel down the steam generator to the sodium outlet 58.

The bayonet tube assemblies 40 are not secured to the baffles 66 and 68 but pass through them loosely enough to permit the bayonet tube assemblies to expand and contract without imparting stresses to the surrounding structure. The use of bayonet tubes which are secured only at one of their ends to a tube sheet and which are slidably secured to the baffles which are secured by a tie rod only at one end to a fixed tube sheet has minimized the thermal growth problems which in many sodium heated steam generators create the hazard of tube failure and its consequent sodium water reaction.

It has already been explained that in spite of precautions such as those discussed above, tube failure and consequent sodium water reaction is an ever present possibility. In order to relieve the present steam generator of the products of such a reaction and thereby eliminate the possibility of an explosion, the central relief tube 70 which is open at its lower end 81 is provided. In the event of a sodium-water reaction, the open lower end of the tube 70 and several windows 82 at the upper end allow sodium into the relief tube 70 to flow upwardly unobstructed to a location where it can be safely treated. During normal operation the sodium will be maintained within the tube 70 at a level which is approximately the same as the level of the sodium in the annular space surrounding the tube 70.

After flowing through the perforated flow distribution sheet 54, the liquid sodium flows through the lower chamber 56 until it reaches the sodium outlet 58 and thereafter passes out of the steam generator 10.

The outgoing sodium flows through a ferrule 84 which has grooves 86 which position sealing rings 88 against the inner cylindrical side wall 90 of the sodium outlet 58. The sodium in the annular space between the bottom 14 of the pressure vessel and the inwardly flared bottom 62 of the flow shroud 60 is restrained from moving into the sodium outlet by the sealing rings 88. This sealing arrangement permits the "insides" that is the entire generator 10 other than the shell 12 and its bottom 14, to be lifted out for inspection or repair without breaking any parts at the lower seal. Similarily the "insides" can be lowered into place and will seal as the sealing rings 88 engage the inner wall 90.

The steam generator is supported by supports 94 which are connected at a location fairly high on the steam generator 10 to prevent it from toppling even in the event of an earthquake. To prevent the steam generator from swinging in such an eventuality the steam generator can be supported laterally in the vicinity of the perforated flow distribution sheet 54. The sheet 54 will transmit forces received externally about the shell 12 and flow shroud 64 through projections 96 which project radially outward from the flow shroud 64 toward the shell 12. The projections 96 do not contact the shell 12 but in the event that an excessive external lateral force should be exerted in the vicinity of the perforated flow distribution sheet, the projection 96 and shell 12 will make contact to distribute the force and avoid a catastrophic collapse of the generator 10.

The foregoing describes but one preferred embodiment of the present invention. Other embodiments are possible and modifications can be made without exceeding the scope of the present invention as defined in the following claims.

What is claimed is:

1. A sodium heated steam generator comprising an elongated vertically extending pressure vessel, a plurality of bayonet tube assemblies extending longitudinally of and within said pressure vessel, said bayonet tube assemblies each having an outer tube closed at its lower end and open at its upper end and an inner tube open at both ends positioned within said outer tube, an upper tube sheet and a lower tube sheet, said inner tubes extending to said upper tube sheet, said outer tubes extending to said lower tube sheet, a water inlet above said upper tube sheet and a steam outlet between said upper tube sheet and said lower tube sheet, a liquid sodium inlet below said lower tube sheet and a liquid sodium outlet at the lower portion of said generator, a release tube open at its lower end and at a location adjacent to the upper end and free of interior obstructions to flow over its entire length, said tube positioned at the longitudinal axis of said generator for releasing the products of an accidental sodium water reaction, said bayonet tube assemblies being positioned radially of said tube, a plurality of annular baffles extending outwardly from said tube with said bayonet tubes extending loosely through said baffles, said baffles including inner baffles permitting sodium to flow downward in substantial quantity only when spaced from said tube, and outer baffles spaced alternately with respect to said first defined baffles and permitting said sodium to flow downwardly only when adjacent to said means.

2. The steam generator defined in claim 1 wherein said outer baffles have a plurality of webs extending inwardly to said means the spaces between said webs permitting said sodium to flow downwardly.

3. The steam generator defined in claim 2 further comprising a plurality of tie rods secured to said lower tube sheet and extending downwardly through said baffles, said baffles being connected to said tie rods.

4. The steam generator defined in claim 3 further comprising a flow shroud, said flow shroud extending vertically and spaced outwardly from said means, the upper end of said flow shroud extending above said sodium inlet so that sodium flowing into said generator through said inlet will flow upwardly over said shroud and then downwardly over said baffles and said bayonet tube assemblies.

5. The steam generator defined in claim 4 further comprising a pressure vessel, said flow shroud being positioned within said vessel with a small vertical annular space between said shroud and said vessel with said space communicating with said sodium inlet so that a portion of said sodium coming through said sodium inlet will flow downward in said space until said space is filled with sodium.

6. The steam generator defined in claim 5 wherein said outer baffles are joined at their outer periphery with said flow shroud.

7. The steam generator defined in claim 6 wherein said flow shroud and pressure vessel are flared inwardly at the bottoms thereof and further comprising a ferrule extending downwardly from the bottom of said flow shroud to direct sodium to said sodium outlet, a sealing ring encircling said ferrule and contacting the inner surface of said sodium outlet.

8. The steam generator defined in claim 7 wherein said ferrule has an annular groove on its outer surface, said ring being in said groove but extending beyond said groove to said inner wall.

* * * * *